United States Patent [19]

Herzog et al.

[11] 3,860,813
[45] Jan. 14, 1975

[54] BEAMSPLITTER AND VERTICALLY ILLUMINATED FLUORESCENT MICROSCOPE USING THE SAME

[76] Inventors: Friedrich Herzog, Pfaffenbergengasse 7/4/1; Franz Twaroch, Schweizertalstrasse 8/3/9, both of Vienna, Austria

[22] Filed: Oct. 31, 1973

[21] Appl. No.: 411,585

[52] U.S. Cl. .................................. 350/91, 350/171
[51] Int. Cl. ............................................ G02b 21/00
[58] Field of Search ............. 350/171, 172, 173, 91

[56] References Cited
UNITED STATES PATENTS
2,403,731  7/1946  MacNeille ........................... 350/173

*Primary Examiner*—James W. Lawrence
*Assistant Examiner*—C. E. Church
*Attorney, Agent, or Firm*—A. H. Spencer; W. C. Nealon; H. R. Berkenstock, Jr.

[57] ABSTRACT

An interference beamsplitter having a glass substrate with an index of refraction ($n_g$) of 1.37 to 1.67 and superimposed coatings with the following properties:

| | Index of Refraction | Coating Thickness In Nanometers |
|---|---|---|
| air | | |
| | $n_1 = 2.10$ to $2.65$ | 151 – 185 |
| | $n_2 = 1.25$ to $1.50$ | 169 – 207 |
| | $n_3 = 2.10$ to $2.65$ | 295 – 361 |
| | $n_4 = 1.25$ to $1.50$ | 161 – 197 |
| | $n_5 = 2.10$ to $2.65$ | 288 – 352 |
| | $n_6 = 1.25$ to $1.50$ | 161 – 197 |
| | $n_7 = 2.10$ to $2.65$ | 288 – 352 |
| | $n_8 = 1.25$ to $1.50$ | 161 – 197 |
| | $n_9 = 2.10$ to $2.65$ | 288 – 352 |
| | $n_{10} = 1.25$ to $1.50$ | 161 – 197 |
| | $n_{11} = 2.10$ to $2.65$ | 144 – 176 |
| glass | | | reflects light having a wavelength from 400 to 500nm and 540 to 570nm while transmitting light having a wavelength of 520 to 530nm and 580 to 590nm avoids the necessity of changing beamsplitters in using vertically illuminated microscopes with two different excitation and fluorescent light wavelengths.

6 Claims, 2 Drawing Figures

BEAMSPLITTER AND VERTICALLY ILLUMINATED FLUORESCENT MICROSCOPE USING THE SAME

BACKGROUND OF THE INVENTION AND DESCRIPTION OF THE DRAWINGS

The invention relates to vertical fluorescent illumination equipment for microscopes, and more particularly to an interference beamsplitter which reflects the spectral range of two principal excitation radiations and transmits the spectral range of two principal fluorescent radiations.

Figure 1:
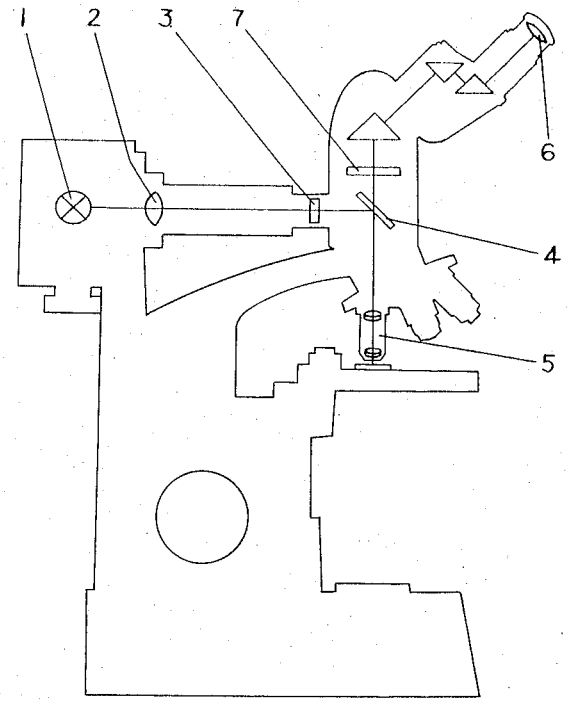
Figure 2:
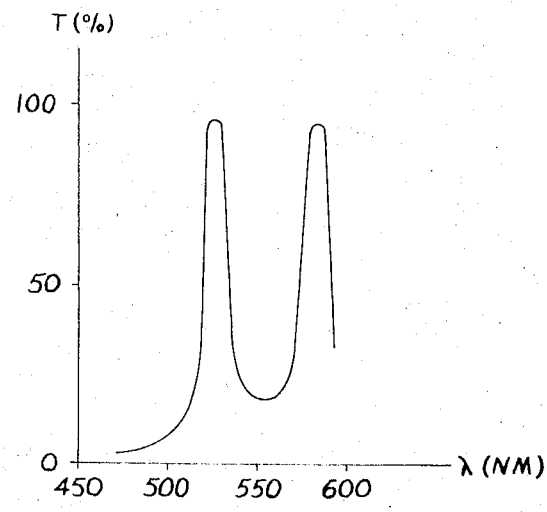

FIG. 1 illustrates a microscope adapted for vertically illuminated fluorescent microscopy, and FIG. 2 shows the transmission curve of one embodiment of the present invention.

In vertical illumination microscopy, the excitation of the specimen is conducted using the incident light. A conventional arrangement in conjunction therewith is illustrated in FIG. 1.

The light from light source 1 is focused by the collector lens 2. Excitation filter 3 segregates that special range of the radiation, which is required for the type of fluorescent microscopy selected. The interference beamsplitter 4 reflects the excitation wavelengths to a high degree in the direction of the object through the objective 5 onto the specimen to stimulate the latter to fluoresce. The fluorescent light of the specimen mixed with reflected excitation radiation is directed toward the beamsplitter 4 by objective 5 where a large portion of the excitation radiation is reflected in the lamp direction while the remainder travels in the direction of the microscope ocular 6 through the beamsplitter. The fluorescent light passes only slightly impeded by the beamsplitter, toward the ocular. The barrier (absorbing) filter 7 finally stops an remnant of the excitation radiation from passing through the ocular and to the eye of the microscopist, while the fluorescence light is transmitted practically completely.

As noted above, the interference beamsplitter must possess the property of a high reflectability for the excitation radiation with slight transmission, and on the other hand, for the longer-wavelength fluorescence produced radiation emitted by the specimen, a high transmission with little reflection.

In fluorescence which, following present day techniques, includes a large part of all fluorescence microscopy, it is usual for a specimen to be treated by staining with different dyes producing different colors of the fluorescent light to distinguish different portions or components of the specimen. In most cases, fluorescein isothiocyanate or rhodamine is used as a dye. The maximum emission of the fluorescent light from excited fluorescein isothiocyanate is at about 525nm, and for rhodamine is at about 590nm. It is well known that the most favorable excitation wavelengths differ according to the specific dye. The range of optimal excitation wavelength for fluorescein isothiocyanate is between about 460 and 490nm, and for rhodamine, about 560nm. In order to provide excitation conditions which are required for different dyes, devices are available which make possible a selective excitation with several spectral ranges. This is done by using two or more interference beamsplitters which can be alternatively brought in proper optical alignment in the ray-path of the vertical illumination fluorescence microscopy by mechanical exchange. Each mirror has a transition from high to low-reflection range at a different wavelength. This arrangement has the disadvantage that it is very complicated and thus very costly especially for ordinary microscopes used for routine examinations. A further disadvantage is the necessity to simultaneously change interference beamsplitters and excitation and barrier filters.

THE INVENTION

It is the aim of the invention to overcome these disadvantages by using a selectively reflecting and selectively transmitting beamsplitter in the ray-path of the vertical illumination fluorescence microscope. The beamsplitter of the present invention is so characterized that it reflects a substantial majority of those wavelength ranges which are necessary for the excitation of the selected fluorchrome and it transmits a substantial majority of light in those ranges in which the emission maxima of the selected dyes lie. The advantage of this arrangement lies in the fact that only one interference beamsplitter is required, whereby the arrangement becomes appreciably simpler mechanically and hence less expensive.

Beamsplitting mirrors according to the present invention are made by plural superimposed coatings on a planar glass substrate. Generally, the glass plate has an index ($n_g$) of 1.37 to 1.67 and preferably of 1.47 to 1.67. Table I relates to the range of values of the thickness of each coating with the corresponding range of indices of refraction. The plural superimposed coatings comprise a series of alternating layers of high and low indices of refraction with the first and last coating being of the higher index of refraction.

TABLE I

Air ($n = 1$)

| Index of Refraction ($n$) | Coating Thickness In Nanometers |
|---|---|
| $n_1$ = 2.10 to 2.65 | 151 to 185 |
| $n_2$ = 1.25 to 1.50 | 169 to 207 |
| $n_3$ = 2.10 to 2.65 | 295 to 361 |
| $n_4$ = 1.25 to 1.50 | 161 to 197 |
| $n_5$ = 2.10 to 2.65 | 288 to 352 |
| $n_6$ = 1.25 to 1.50 | 161 to 197 |
| $n_7$ = 2.10 to 2.65 | 288 to 352 |
| $n_8$ = 1.25 to 1.50 | 161 to 197 |
| $n_9$ = 2.10 to 2.65 | 288 to 352 |
| $n_{10}$ = 1.25 to 1.50 | 161 to 197 |
| $n_{11}$ = 2.10 to 2.65 | 144 to 176 |

Glass $n_g$ = 1.37 to 1.67

Beamsplitters having a glass substrate with an index of refraction of about 1.47 to 1.54 and coating thicknesses as set forth in Table II are preferred with coatings having the following values.

TABLE II

Air

| Index of Refraction | Coating Thickness In Nanometers |
|---|---|
| $n_1$ = 2.30 to 2.50 | 164 to 172 |
| $n_2$ = 1.33 to 1.39 | 183 to 193 |
| $n_3$ = 2.30 to 2.50 | 320 to 336 |
| $n_4$ = 1.33 to 1.39 | 170 to 188 |
| $n_5$ = 2.30 to 2.50 | 304 to 336 |
| $n_6$ = 1.33 to 1.39 | 170 to 188 |

TABLE II-Continued

| | | |
|---|---|---|
| $n_7$ | = 2.30 to 2.50 | 304 to 336 |
| $n_8$ | = 1.33 to 1.39 | 170 to 188 |
| $n_9$ | = 2.30 to 2.50 | 304 to 306 |
| $n_{10}$ | = 1.33 to 1.39 | 170 to 188 |
| $n_{11}$ | = 2.30 to 2.50 | 156 to 164 |
| Glass | | |

Preferably, the higher index coating material is titanium oxide with an index of refraction of about 2.4 and the other coating material is mixed fluoride with an index of refraction of about 1.36. When one or more of the coatings is susceptible to damage by scratching or attach by atmospheric moisture, suitable protection may be obtained by selecting an external coating, such as oxides which protect the under layers and adding a protective edge to prevent chemical attack from the susceptible layer edges.

In order to further simplify the operation, the excitation and barrier filter slides may be machanically coupled, so that with a single handle and only with one stationary mirror, the change can be rapidly effected between different excitation wavelengths, for example, for fluorescein isothiocyanate and rhodamine.

FIG. 2 shows as one example, the transmission curve of an interference beamsplitter according to the invention with a 45° angle of incidence. In conjunction therewith, it is to be recognized that the range between 450 and 500nm is highly reflected (slight transmission T), while the range of the transmission of the fluorescein isothicyanate passes through the mirror at 525nm without significant obstruction. Likewise, the range at 546nm (green HG-line) is highly reflected, while the emission range of the rhodamine (at 590nm) is transmitted.

A mirror which possesses these features can be manufactured by vapor coating in high vacuum a succession of alternating layers of titanium oxide and silicon dioxide or cryolite and zinc sulfide to provide layers of alternating high and low refractive indices. Thus, the values of each layer for the construction are indicated below.

TABLE III

| | Index of Refraction | Coating Thickness In Nanometers |
|---|---|---|
| Air | 1 | |
| $n_1$ | = 2.4 | 168 |
| $n_2$ | = 1.36 | 188 |
| $n_3$ | = 2.4 | 328 |
| $n_4$ | = 1.36 | 179 |
| $n_5$ | = 2.4 | 320 |
| $n_6$ | = 1.36 | 179 |
| $n_7$ | = 2.4 | 320 |
| $n_8$ | = 1.36 | 179 |
| $n_9$ | = 2.4 | 320 |
| $n_{10}$ | = 1.36 | 179 |
| $n_{11}$ | = 2.4 | 160 |
| Glass $n_o$ | = 1.52 | |

Coatings having indices of refraction $n_1$, $n_3$, $n_5$, $n_7$, $n_9$ and $n_{11}$ are zinc sulfide and $n_2$, $n_4$, $n_6$, $n_8$ and $n_{10}$ are for coatings of cryolite. The transmission characteristics of this mirror are graphically represented in FIG. 2 for a light incidence angle of 45°.

What is claimed is:

1. A beamsplitter for transmitting a substantial majority of 45° incident light having a wavelength of 520nm to 530nm and 580nm to 590nm and reflecting a substantial majority of 45° incident light having a wavelength of 400nm to 500nm and 540nm to 570nm comprises a planar glass plate having an index of refraction of 1.37 to 1.67 with a plurality of superimposed coatings having the following values:

| | Index of Refraction | Coating Thickness In Nanometers |
|---|---|---|
| air | | |
| $n_1$ | = 2.10 to 2.65 | 151-185 |
| $n_2$ | = 1.25 to 1.50 | 169-207 |
| $n_3$ | = 2.10 to 2.65 | 295-361 |
| $n_4$ | = 1.25 to 1.50 | 161-197 |
| $n_5$ | = 2.10 to 2.65 | 288-352 |
| $n_6$ | = 1.25 to 1.50 | 161-197 |
| $n_7$ | = 2.10 to 2.65 | 288-352 |
| $n_8$ | = 1.25 to 1.50 | 161-197 |
| $n_9$ | = 2.10 to 2.65 | 288-352 |
| $n_{10}$ | = 1.25 to 1.50 | 161-197 |
| $n_{11}$ | = 2.10 to 2.65 | 144-176 |
| glass. | | |

2. The beamsplitter of claim 1 wherein the glass substrate has an index of refraction of 1.47 to 1.67 and the coatings have the following values:

| | Index of Refraction | Coating Thickness In Nanometers |
|---|---|---|
| Air | | |
| $n_1$ | = 2.30 to 2.50 | 164 to 172 |
| $n_2$ | = 1.33 to 1.39 | 183 to 193 |
| $n_3$ | = 2.30 to 2.50 | 320 to 336 |
| $n_4$ | = 1.33 to 1.39 | 170 to 188 |
| $n_5$ | = 2.30 to 2.50 | 304 to 336 |
| $n_6$ | = 1.33 to 1.39 | 170 to 188 |
| $n_7$ | = 2.30 to 2.50 | 304 to 336 |
| $n_8$ | = 1.33 to 1.39 | 170 to 188 |
| $n_9$ | = 2.30 to 2.50 | 304 to 306 |
| $n_{10}$ | = 1.33 to 1.39 | 170 to 188 |
| $n_{11}$ | = 2.30 to 2.50 | 156 to 164 |
| Glass. | | |

3. The beamsplitter of claim 2 wherein the coatings having an index of refraction (n) of 2.3 to 2.5 is an oxide of titanium and the coatings having an index of refraction of 1.33 to 1.39 are selected from the group consisting of magnesium fluoride.

4. The beamsplitter of claim 3 wherein the glass substrate has an index of refraction of 1.52 and the coatings have the following values:

| | Index of Refraction | Coating Thickness In Nanometers |
|---|---|---|
| Air | 1 | |
| $n_1$ | = 2.4 | 168 |
| $n_2$ | = 1.36 | 188 |
| $n_3$ | = 2.4 | 328 |
| $n_4$ | = 1.36 | 179 |
| $n_5$ | = 2.4 | 320 |
| $n_6$ | = 1.36 | 179 |
| $n_7$ | = 2.4 | 320 |
| $n_8$ | = 1.36 | 179 |
| $n_9$ | = 2.4 | 320 |
| $n_{10}$ | = 1.36 | 179 |
| $n_{11}$ | = 2.4 | 160 |
| Glass $n_o$ | = 1.52. | |

5. A vertical fluorescent microscope having a beamsplitter as defined in claim 1.

6. A vertical fluorescent microscope having a beamsplitter as defined in claim 4.

* * * * *

UNITED STATES PATENT OFFICE
CERTIFICATE OF CORRECTION

Patent No. 3,860,813   Dated January 14, 1975

Inventor(s) Friedrich Herzog and Franz Twaroch

It is certified that error appears in the above-identified patent and that said Letters Patent are hereby corrected as shown below:

[73]   Assignee:   C. Reichert Optische Werke AG
Vienna, Austria

Signed and sealed this 15th day of April 1975.

(SEAL)
Attest:

RUTH C. MASON
Attesting Officer

C. MARSHALL DANN
Commissioner of Patents
and Trademarks